Figure 1:
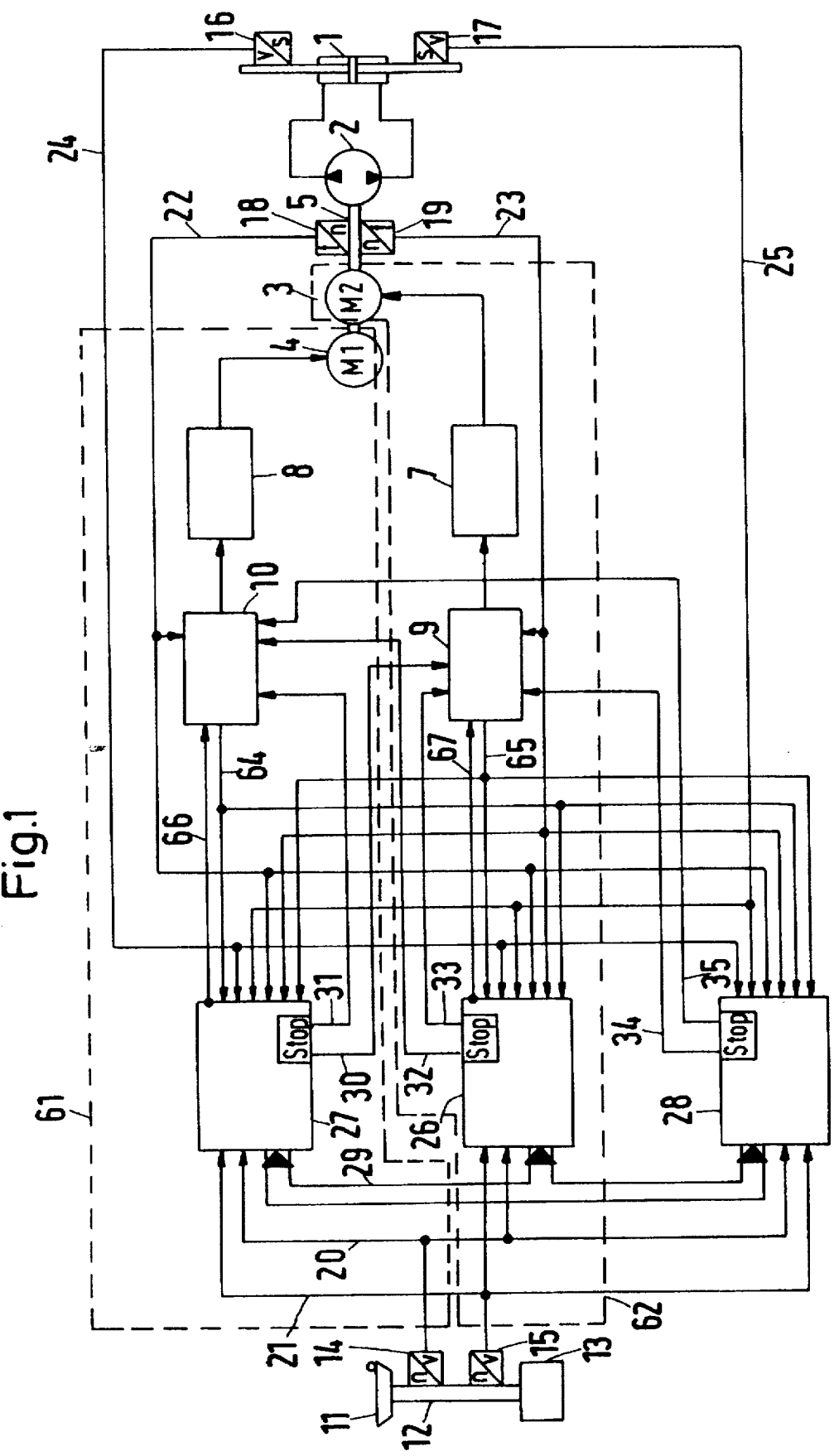

United States Patent [19]
Friedrichsen et al.

[11] Patent Number: 5,747,950
[45] Date of Patent: May 5, 1998

[54] STEERING SYSTEM FOR VEHICLES OR SHIPS

[75] Inventors: Welm Friedrichsen, Nordborg; Aksel Baagø Jepsen, Augustenborg, both of Denmark

[73] Assignee: Danfoss A/S, Nordborg, Denmark

[21] Appl. No.: 446,684

[22] PCT Filed: Nov. 30, 1993

[86] PCT No.: PCT/DK93/00389

§ 371 Date: Jun. 1, 1995

§ 102(e) Date: Jun. 1, 1995

[87] PCT Pub. No.: WO94/13523

PCT Pub. Date: Jun. 23, 1994

[30] Foreign Application Priority Data

Dec. 11, 1992 [DE] Germany ............... 42 41 849.6

[51] Int. Cl.$^6$ .................................. G05B 9/03
[52] U.S. Cl. ................ 318/5; 318/564; 318/588
[58] Field of Search .............. 318/5, 560, 563–565, 318/566, 580, 587, 588, 49, 434, 495, 523; 180/132, 133, 79.1; 395/575; 364/424.01, 431.11, 424.05; 371/7, 8.1, 9.1; 60/403, 405

[56] References Cited

U.S. PATENT DOCUMENTS

| | | | |
|---|---|---|---|
| 4,315,171 | 2/1982 | Schaeffer | 310/49 R |
| 4,472,806 | 9/1984 | Blair | 371/68.1 |
| 4,622,667 | 11/1986 | Yount | 395/182.09 |
| 4,736,811 | 4/1988 | Marsden et al. | 180/133 |
| 4,771,846 | 9/1988 | Venable | 180/42 |
| 4,828,060 | 5/1989 | Drutchas et al. | 180/79.1 |
| 4,965,879 | 10/1990 | Fischer, Jr. | 364/424.01 |
| 5,107,424 | 4/1992 | Bird et al. | 364/424.01 |
| 5,170,343 | 12/1992 | Matsuda | 364/184 |
| 5,181,380 | 1/1993 | Faure et al. | 60/405 |
| 5,201,380 | 4/1993 | Callahan | 180/132 |
| 5,271,013 | 12/1993 | Gleeson | 371/9.1 |
| 5,274,554 | 12/1993 | Takats et al. | 364/424.038 |
| 5,295,258 | 3/1994 | Jewett et al. | 395/575 |
| 5,493,497 | 2/1996 | Buus | 364/424.013 |
| 5,550,736 | 8/1996 | Hay et al. | 364/424.012 |

FOREIGN PATENT DOCUMENTS

| | | |
|---|---|---|
| 0 350 020 | 1/1990 | European Pat. Off. |
| 35 36 563 | 4/1986 | Germany |
| 38 12 317 | 11/1988 | Germany |
| 40 11 947 | 10/1990 | Germany |
| WO 88/09281 | 12/1988 | WIPO |

*Primary Examiner*—Brian Sircus
*Attorney, Agent, or Firm*—Lee, Mann, Smith McWilliams, Sweeney & Ohlson

[57] ABSTRACT

A steering system for vehicles or ships is provided, with a steering handwheel and a steering element with no mechanical linkage line therebetween, with a steering handwheel sensor device, a steering element sensor device and a control arrangement which, in dependence on the output signals of the sensor devices, operates an electromechanical transducer, on the output side of which the steering element is arranged. It is desirable to increase the reliability of such a steering system For that purpose, the control arrangement comprises at least two independent control units, and a fault-monitoring device is provided which precludes a defective control unit from influencing the steering element.

18 Claims, 4 Drawing Sheets

STEERING SYSTEM FOR VEHICLES OR SHIPS

The invention relates to a steering system for vehicles or ships with a steering handwheel and a steering element with no mechanical linkage line therebetween, with a steering handwheel sensor device, a steering element sensor device and a control arrangement which, in dependence on the output signals of the sensor devices, operates an electromechanical transducer, on the output side of which the steering element is arranged.

In this connection, steering element is a collective term for direction-defining units on a vehicle or a ship. These are, for example, the steered wheels of the vehicle or the rudder of a ship.

In a known steering system of that kind (U.S. Pat. No. 4,771,846), the wheels of a vehicle are steered by means of a hydraulic piston-cylinder unit. The hydraulic piston-cylinder unit is supplied by way of a proportional valve with pressurized hydraulic fluid by a pump. The proportional valve is operated by an electrical control unit by means of electromagnets and together with the magnets forms the electromechanical transducer. For this purpose, the electrical control arrangement receives signals from a steering angle sensor, which detects the lock of the wheels, and from a steering handwheel sensor, which detects the position of the steering handwheel shaft. The proportional valve is controlled so that the value predetermined by the steering handwheel sensor can be set at the steered wheels and reported back by the steering angle sensor. A steering system of that kind has the disadvantage that in the event of failure of the electrical control arrangement or the proportional valve, the entire steering system fails. The vehicle can then no longer be steered.

A further steering system is known from DE 35 36 563 C2. Movement of the steering handwheel causes an electric motor, which drives a pump, to be set in operation by way of switching electronics. The pump in its turn is connected to one of the two work chambers of a work cylinder. The direction of rotation of the pump determines the direction in which the work cylinder is extended. The steering also fails in this system if the switching electronics, the electric motor or the pump are defective.

DE 40 11 947 describes a further steering system which steers two steerable wheels independently of one another. Here, each wheel is controlled by means of an electric servomotor which drives a gearwheel that acts on a rack. The servomotor is supplied by an electronic control unit which operates with input data from the sensors. If the electronic control unit fails, the vehicle can no longer be steered.

The invention is therefore based on the problem of providing a steering system which has a greater degree of reliability.

This problem is solved in a steering system of the kind mentioned in the introduction in that the control arrangement has at least two independent control units, and a fault-monitoring device is provided which precludes a defective control unit from influencing the steering element.

The terms control unit and fault-monitoring device are to be understood in this context in functional terms. The fault-monitoring device may also be formed by a control unit. Conversely, a control unit can be used as fault-monitoring device. The system is therefore constructed with a redundancy factor. Even when a control unit fails, the vehicle or the ship can continue to be steered provided that at least one control unit is still intact. A largely fault-tolerant system is consequently achieved, which operates with the same reliability as steering systems which are equipped with a mechanical emergency steering function. Unlike these systems, in which a higher operating force is necessary in the event of a fault, operation of the present system can be continued with the same degree of convenience, even in the event of a fault. The vehicle can continue to be driven. Repairs can be carried out at a later date at a more convenient time.

In a preferred embodiment, at least one sensor device has several independently operating sensors, especially a number of such sensors corresponding to the number of control units. Failure of one sensor is then unimportant. Reliability is further increased.

Preferably, the electromechanical transducer has at least one electric motor which drives at least one reversible pump. A simple and reliable transducer is thereby obtained. The direction of rotation of the pump determines the direction in which the steering element is extended.

In this connection, each control unit is preferably connected to at least one electric motor. Reliability is further increased by this. If a control unit fails, only the associated electric motor is adversely affected. The other control units can continue to operate their associated motors. If a motor fails, only the path in which that motor is arranged is affected. The other path or paths can continue to operate.

Preferably, several electric motors have a common rotor and separate stator windings, at least two stator windings being controlled by different control units. This creates a motor of compact construction which is also able to operate if a control unit fails.

In a preferred construction, provision is made for each electric motor to drive its own pump. By that means, a redundant control is achieved right up to the steering element.

It is also preferred for several pumps to have a common drive shaft. Increased redundancy and therefore improved reliability can thereby be obtained for the pumps.

The electric motor is advantageously constructed as a multiphase motor with at least three phases, each motor being actuated by a motor-controlling arrangement, which in turn is controllable by the control unit.

The use of at least three phases means that the direction of rotation of the motor can be determined by the control unit. If a fault occurs in one of the phases of the motor, this has no influence on one or more other motors which drive the shaft or the pumps.

In an especially preferred construction, the motor has at least five phases, of which at least two are arranged to be actuated in dependence on respective separate control units. One motor, which can be of relatively compact construction yet nevertheless fault-tolerant, is thereby sufficient. The motor also functions when one phase is interrupted or short-circuited or fails for some other reason. The torque of the motor is somewhat reduced by this, but since making the motor somewhat oversize for emergency situations presents no problems, this does not affect the function. The five phases of the motor can supply five independent control units.

Advantageously, each electric motor has a current-monitoring device for each phase. The direction of rotation of the motor can be determined and thus monitored from the phase sequence of the current. The function and the operation of the electric motor can also in principle be monitored by means of the current-monitoring device.

In this connection it is especially preferred that the current-monitoring device generates a fault signal whenever the actual current that is flowing differs by more than a certain amount from a previously determinable current. The predeterminable current is dependent, for example, on whether the motor is just starting up or has already reached a stable state. If inconsistencies arise, that is, the expected currents do not appear in the individual phases, this is an indication that there are faults present. The fault-monitoring device can then decide, for example, whether it must intervene before a fault becomes critical.

It is also advantageous if one or more sensors which produce signals in dependence on the rotational speed, the direction of rotation and/or the angular position of the pump or the drive shaft are provided. This creates an additional opportunity for monitoring the steering system. The system is then able to check whether the pump actually starts operating when the electric motors are supplied with current. The direction of rotation of the pump can be monitored to check whether it is consistent with the desired direction of rotation. In this connection, further potential faults are eliminated, such as those that may occur if, in an extreme fault situation, the electric motors rotate such that they bring the steering element into a direction which is opposite to that set by means of the steering handwheel.

Preferably, the fault-monitoring device classifies faults that occur into one of several classes, and produces a warning when faults of a predetermined class occur. This means that normal operation can be continued with a series of non-critical faults. The faults are stored and indicated at a later time, for example during regular maintenance or inspection. If critical faults occur, however, then a warning is given immediately, even if, for example, continued operation is possible. A typical situation that is critical but does not warrant operation being interrupted, would be in a system with three control units when two of those units are defective. In such a case the faults would have to be rectified as soon as possible.

Each control unit and the fault-monitoring device preferably has a microprocessor, wherein all the microprocessors receive the same input signals from the sensor devices, the microprocessors are interconnected and compare their results with the results of the other microprocessors and they prevent the microprocessor of which the results are not consistent with the other results from influencing the steering element. The control units and the fault-monitoring device can be of identical construction. The fault-monitoring device can also be used to control an electric motor with a pump connected thereto. Should the control units and fault-monitoring device be of the same construction, fault detection is effected, for example, by a kind of majority decision. Independently of this, however, fault detection is possible if states that are inconsistent with one another occur in a control unit. In this preferred construction, at least two control units are able independently to perform the required control. At the same time, the third microprocessor makes the same calculations as the other two. In this case a fault is recognised so early and with such reliability that a defective control device can be switched off before it causes significant damage.

In an alternative construction, it is preferably arranged for the fault-monitoring device to comprise a microprocessor and for the control units to be formed by analog and/or digital circuits. In that case conventional controllers can be used.

The control units are here preferably provided with integrated power electronics. The electrical energy required for driving the motors is therefore directly available at the output of the controllers.

In a preferred construction, provision is made for the fault-monitoring device to have an influence on the control behaviour of the control units that is limited in particular to a predetermined percentage of the maximum possible control. For that purpose, the monitoring device expediently receives the same data as the individual control units. If the difference between the desired and actual value is too large, then the monitoring device is able to accelerate the approximation of the actual value to the desired value to a limited extent. Discrepancies in the position of the steering handwheel and steering locks of the steering element can also be compensated to achieve a balancing out of leakages. A steering element in a hydraulic system will frequently slowly shift its zero point on account of minor leakages in the control valves. Even in a system in which the pump is directly connected to the steering element, minor leakages can occur which lead to shifting of the zero point. It is therefore an advantage that the system is able to compensate for these discrepancies. These are compensated for in operation, before they assume significant proportions. Limiting the control to a maximum value ensures that the fault-monitoring device has the opportunity to assume control over the control units. This prevents faults in the fault-monitoring device having a damaging effect on operation. The largest possible fault that may occur is limited to the extent that the steering element has to be slightly corrected. Because the fault-monitoring device receives signals directly from the sensors, it is able to check the function of the system immediately without having to rely on derived measurements.

Limiting the control can be effected in an advantageous construction by restricting a transfer of digital data from the fault-monitoring device to the control units to the least significant bits. For example, this can be achieved by the hardware construction of a data bus that is used to connect the control units to the fault-monitoring device. The hardware structure ensures with complete reliability that the fault-monitoring device has only a limited influence on the control unit. Even a short-circuit between signals can cause only relatively small departures.

The steering handwheel is preferably connected by way of a steering handwheel shaft to a torque-loading unit which generates a counter-torque on the steering handwheel which is dependent on the operator and/or on requirements that are adjustable in dependence on the operational behaviour and/or the operational state of the vehicle. Operational behaviour is to be understood to mean dynamic variables such as vehicle speed, steering wheel speed or steering angle, while the operational state can be expressed by other parameters, such as loading or tyre pressure. Despite the absence of a direct mechanical linkage between the steering handwheel and the steering element, an appropriate sensation of steering can be imparted to the operator.

In a preferred construction, the electromechanical transducer may also comprise several electrically operable valves, which provide a controlled supply of hydraulic fluid to a steering motor. This means that the invention can be used in combination with existing hydraulic units. The construction can be given redundancy in that several control valves are connected in parallel so that one active valve is sufficient for control of the steering element. The individual control elements can then supply the control valves independently of one another.

In this connection, in a preferred construction, provision is made for the hydraulic valves to be in the form of ON-OFF valves, which are arranged in a direction-defining bridge, compensating valves for controlling the through-flow being arranged in the forward flow and in the return flow. This means that relatively fault-proof hydraulic valves can be achieved and the direction definition and the volume control are separated. Through control of the through-flow in the foward flow and in the return flow, the flow of hydraulic fluid can be interrupted in several ways. If all valves are constructed so that they block the through-flow in the absence of a signal, very fault-proof valves are obtained which can be used to advantage in known steering systems.

Figure 5:
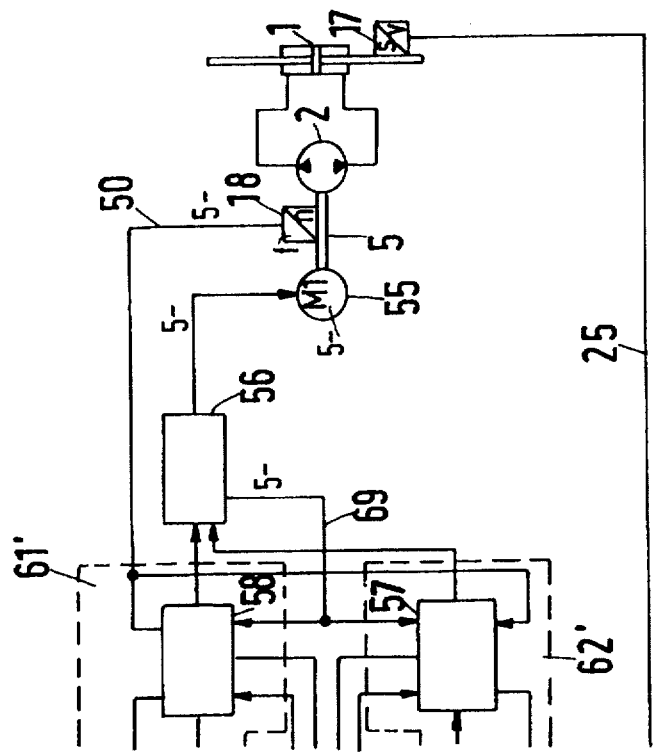
Figure 3:
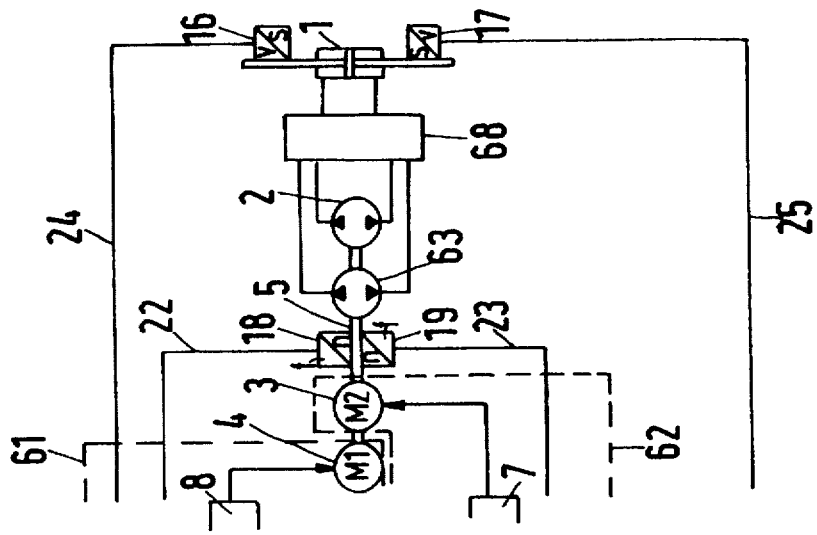
Figure 2:
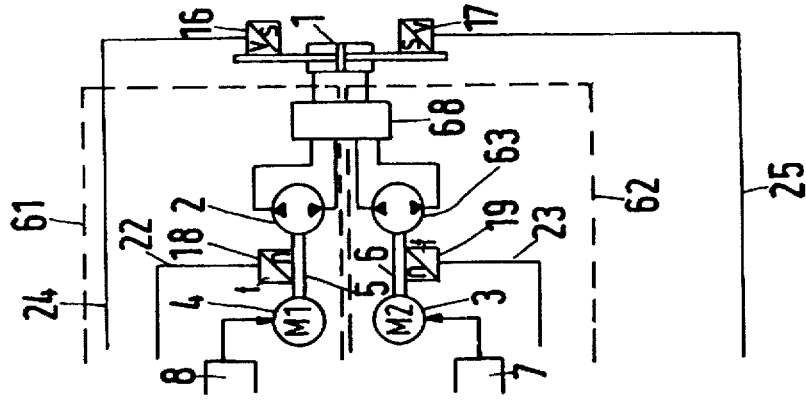
Figure 4:
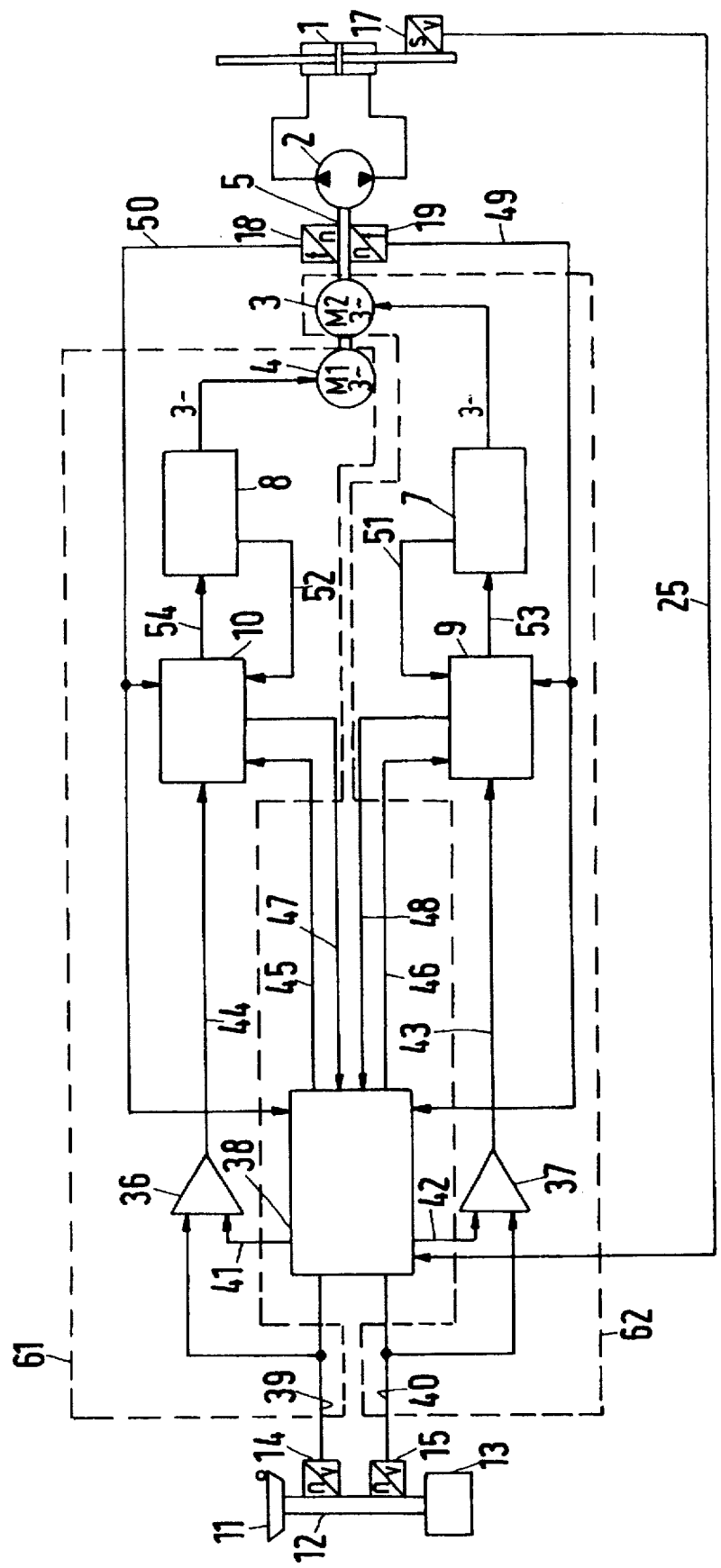
Figure 6:
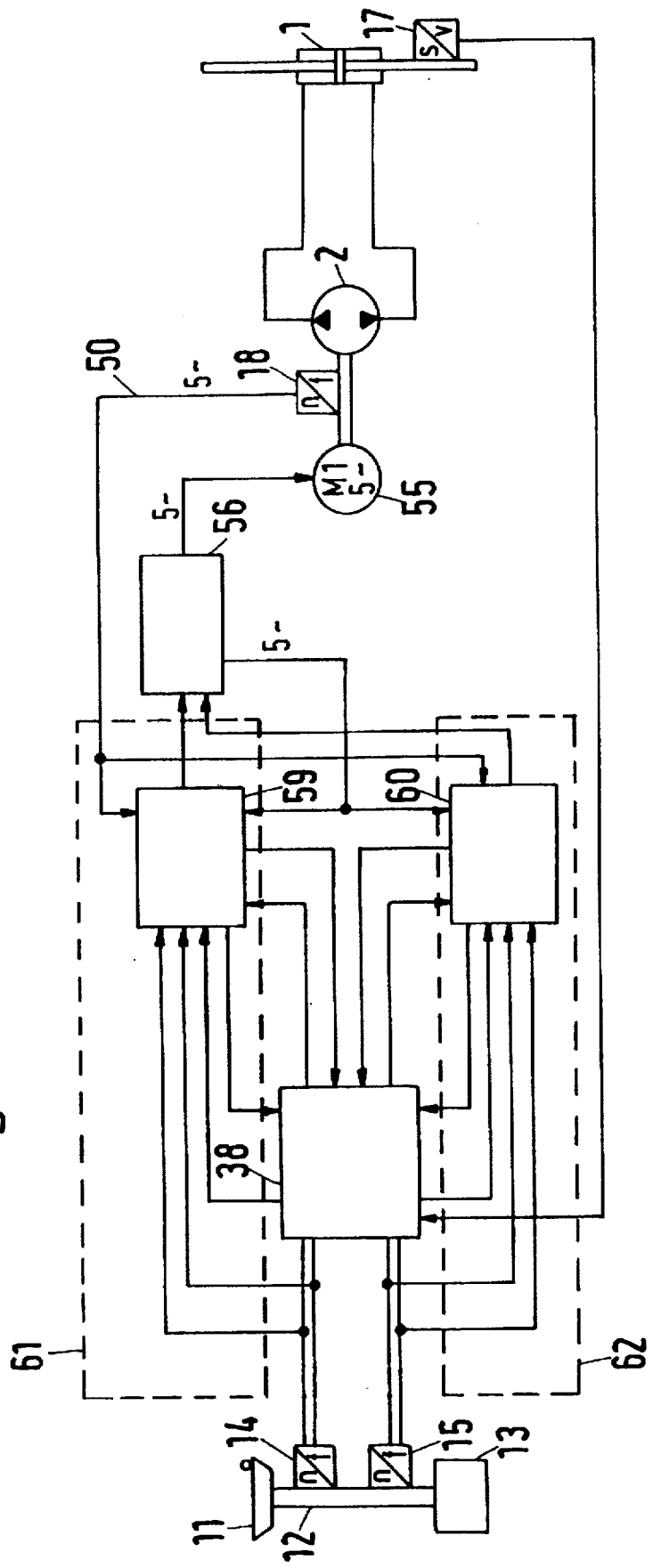

The invention is explained hereinafter with reference to preferred embodiments and in conjunction with the drawings, in which FIG. 1 shows a first embodiment of the invention, FIG. 2 shows a modification of a part of the system according to FIG. 1, FIG. 3 shows a second modification of the part of the system according to FIG. 1, FIG. 4 shows a second embodiment, FIG. 5 shows a modification of a part of the system according to FIG. 4 and FIG. 6 shows a third embodiment.

A steering system comprises a work cylinder 1 and a steering handwheel 11. On rotation of the steering handwheel 11, the work cylinder 1 should adjust so that a steering element, not shown in detail, for example steered wheels of a vehicle or the rudder of a ship, takes up an angular position which corresponds to the angular position of the steering handwheel 11. There is no mechanical linkage between the work cylinder 1 and the steering handwheel 11. On the contrary, the work cylinder 1 is supplied with pressurized hydraulic fluid by a pump 2. The pump 2 is reversible. Its direction of rotation determines the actuation direction of the work cylinder 1. The pump 2 is driven by two motors 3 and 4 by way of a common shaft 5.

Each motor 3, 4 is a component of a control circuit 62, 61. In addition to the motors 3, 4, each control circuit 62, 61 has power electronics 7, 8 which are connected to the associated motor 3, 4 and provide a controlled supply of electrical energy. Furthermore, a motor-controlling unit 9, 10 which is connected to the power electronics 7, 8 is provided. The motor-controlling unit 9, 10 is in its turn connected to a microcontroller 26, 27. The microcontrollers contain microprocessors with several peripheral components. Desired values are supplied to the control circuits 61, 62 by way of steering handwheel sensors 14, 15, which are arranged on a steering handwheel shaft 12 and detect here a rotation of the steering handwheel 11. If desired, not only can the instantaneous angular setting or position of the steering handwheel 11 be detected, but also the rotational speed at which the steering handwheel 11 is turned. At its other end, the steering handwheel shaft 12 is loaded with a torque by a torque-loading unit 13, so that an operator feels a certain resistance when steering. The torque can be adjusted in dependence on speed and/or by the operator.

The actual values for the control circuits 61, 62 are detected by means of steering motor sensors 16, 17 and supplied to the control circuits 61, 62. Furthermore, drive shaft sensors 18, 19 that detect a rotation of the shaft 5 can also be provided.

In addition to the control circuits 61, 62, a microcontroller 28 is provided, to which the same input values from the sensor 14 to 19 are supplied and which is connected by way of a data bus 29 to the microcontrollers 26 and 27.

Each sensor 14 to 19 is connected to all microcontrollers 26 to 28. This is effected in the case of the steering handwheel sensor 14 by way of a signal line 20, in the case of the steering handwheel sensor 15 by way of a signal line 21, in the case of the drive shaft sensor 18 by way of a signal line 22, in the case of the drive shaft sensor 19 by way of a signal line 23, in the case of the steering element sensor 16 by way of a signal line 24 and in the case of the steering element sensor 17 by way of a signal line 25.

The microcontroller 27 controls the motor-controlling unit 10 by way of a signal line 66. The microcontroller 26 controls the motor-controlling unit 9 by way of a signal line 67. The motor-controlling unit 10 reports the current flowing in the motor 4 by way of a signal line 64 to all three microcontrollers 26 to 28. Similarly, the motor-controlling unit 9 reports the current flowing in the motor 3 by way of a signal line 65 to all microcontrollers 26 to 28. Each microcontroller 26 to 28 has two stop outputs 32, 33 and 30, 31 or 34, 35.

The input signals and the results of the three microcontrollers 26 to 28 calculated therefrom are compared by way of the data bus 29. This enables the three microcontrollers 26 to 28 to "decide" jointly whether a control circuit 61, 62 or an element thereof is defective and whether for that reason the motor-controlling unit 9 or the motor-controlling unit 10 can be stopped. Since each microcontroller 26 to 28 is connected by one of its two stop outputs 31 to 36 with one of the motor-controlling units 9, 10, each microcontroller 26 to 28 is also able to stop each motor-controlling unit. The program performed in the microcontrollers 26 to 28 ensures that only one control circuit can be disabled at one time. Even when one motor fails, the pump 2 can continue to be operated. The remaining motor then admittedly has to drive with it an idling motor and expend somewhat greater effort, but this can be taken into account when designing the system.

FIG. 2 shows a part of the steering system in a modified construction. Identical parts have been given the same reference numbers. The single pump 2 has been replaced by two pumps 2, 63. Each pump 2, 63 is connected by way of a separate shaft 5, 6 to the motors 4, 3. The two pumps 2, 63 feed the hydraulic fluid by way of a valve block 68 into the work cylinder 1. This embodiment is otherwise identical with that of FIG. 1.

FIG. 3 shows a further modification in a part of the system according to FIG. 1. The two pumps 2, 63 are arranged on a common shaft 5 on which the two motors 3, 4 are also arranged.

In FIGS. 2 and 3 the system is capable of operation even in one pump fails.

FIG. 4 shows an alternative embodiment of a system, in which identical or corresponding parts have been provided with the same reference numbers. The system is constructed using analog technology or hardwired technology. The control circuits 61, 62 are monitored by a microcontroller 38 which determines which of the two control circuits 61, 62 is coming into action, that is, has to be switched on or off. In addition, the microcontroller 38 has a limited influence on the control circuits 61, 62', so that certain discrepancies, such as shifts in the zero point, can be compensated for without the microcontroller 38 having undue influence on the operation of the control system.

The two control circuits 61, 62, are of identical construction, but independent of one another. The control circuit 61 has a measuring amplifier 36, which is connected by way of a signal line 39 to the steering handwheel sensor 14. A second input of the measuring amplifier 36 is connected to the microcontroller 38. From the measuring amplifier 36, signals are supplied by way of a signal line 44 to the motor-controlling unit 10. From here, a signal line 54 leads to the power electronics 8, which are connected to the electric motor 4 by way of a three-phase line. The power electronics 8 send information about the current flowing in the motor 4 back to the motor-controlling unit 10 by way of a signal line 52. The other control circuit 62 is correspondingly constructed. A measuring amplifier 37, which is connected by way of a signal line 40 to the steering handwheel sensor 15, is connected by way of a signal line 43 to the motor-controlling unit 9, which is connected by way of a signal line 53 to the power electronics 7. These are connected on the one hand by way of a three-phase line to the electric motor 3, and on the other hand by way of a signal line 51 to the motor-controlling unit 9, in order to report information about the current flowing in the motor 3 back to the motor-controlling unit 9.

The drive shaft sensors 18, 19 are connected by way of signal lines 50, 49 both to the motor-controlling units 9, 10 and to the microcontroller 38.

The microcontroller 38 has two compensating outputs which are connected by way of signal lines 41, 42 to further inputs of the measuring amplifiers 36, 37. The microcontroller 38 is connected by way of the signal line 25 to the steering element sensor 17. The microcontroller 38 is therefore able to compare the actual result at the work cylinder 1 with the desired requirements of the steering handwheel sensors 14, 15.

The motor-controlling units 9, 10 monitor the rotational speed of the shaft, and thus the speed of the motors 3, 4, by means of the drive shaft sensors 18, 19. The motor-controlling units 9, 10 signal faults by way of signal lines 47, 48 to the microcontroller 38. The microcontroller 38 can then send out a stop signal to one of the motor-controlling units 9, 10 by way of signal lines 45, 46.

With the assistance of the phase current monitoring by way of the signal lines 51, 52 and the drive shaft sensors 18, 19, it is possible to determine whether the direction of rotation of the motors 3, 4 and therewith the operational direction of the pump 2 correspond to requirements. In addition, faults, that is to say, departures from predetermined desired values, can be recognized very early.

FIG. 5 shows a departure from the construction shown in FIG. 4. The two three-phase motors 3 and 4 have been replaced by a five-phase motor 55 which drives the pump 2 by way of the shaft 5. Correspondingly, the two power electronics 7, 8 have been replaced by five-phase power electronics 56, which are actuated by the two motor-controlling units 57, 58. The power electronics 56 report the phase currents to the motor controlling units 57, 58 by way of a signal line 69. The motor controlling-units 57, 58 can be designed so that they supply five-phase signals to the power electronics 56. The power electronics 56 can be made up of five separate units, so that faults in one unit do not affect the function of the remaining units. A five-phase motor functions even when one phase is not operative. Corresponding power losses can be taken into account in advance by suitable dimensioning.

FIG. 6 shows a third construction, in which identical and corresponding parts have been provided with the same reference numbers.

The measuring amplifiers of FIG. 4 have now been integrated into the motor-controlling units 59, 60. The steering handwheel sensors 14, 15 have two signal lines so that they can send out direction and speed signals by way of separate signal lines. Otherwise, the function is the same as in FIG. 5.

We claim:

1. A steering system for vehicles or ships having a steering handwheel and a steering element with no mechanical linkage line therebetween, a steering handwheel sensor device, a steering element sensor device and a control arrangement which, in dependence on output signals of the sensor devices, operates an electromechanical transducer connected for operating the steering element, and in which the control arrangement has at least two independent control units independently connected to said transducer and a fault-monitoring device, said fault monitoring device including means to preclude a defective control unit from influencing the steering element, said electromechanical transducer having at least one electric motor which drives at least one reversible drive shaft, and including one or more sensors which produce signals in dependence on at least one of the rotational speed, the direction of rotation and the angular position of the drive shaft.

2. A system according to claim 1, in which at least one sensor device has several independently operating sensors corresponding in number to the number of control units.

3. A system according to claim 1, in which each control unit is connected to at least one electric motor.

4. A system according to claim 3, in which several electric motors drive a common pump.

5. A system according to claim 4, in which the several electric motors have a common rotor and separate stator windings, at least two stator windings being controlled by different control units.

6. A system according to claim 1, in which each electric motor drives its own pump.

7. A system according to claim 1, in which several pumps have a common drive shaft.

8. A system according to claim 1, in which the electric motor is a multiphase motor with at least three phases, said motor being arranged to be actuated by a motor-controlling arrangement, which in turn is controllable by the control unit.

9. A system according to claim 8, in which the motor has at least five phases, of which at least two are arranged to be actuated in dependence on respective separate control units.

10. A system according to claim 8, in which each electric motor has a current-monitoring device for each phase.

11. A system according to claim 10, in which the current-monitoring device generates a fault signal whenever the actual current that is flowing differs by more than a certain amount from a previously determinable current.

12. A system according to claim 1, in which the fault-monitoring device includes means to classify faults that occur into one of several classes, and produce a warning when faults of a predetermined class occur.

13. A system according to claim 1, in which each control unit and each fault-monitoring device has a microprocessor, each microprocessor receiving the same input signals from the sensor devices, the microprocessors being interconnected and including means to compare their results with the results of the other microprocessors and prevent the microprocessor of which the results are not consistent with the other results from influencing the steering element.

14. A system according to claim 1, in which the fault-monitoring device comprises a microprocessor and the control units are formed by analog or digital circuits.

15. A system according to claim 14, in which the control units are provided with integrated power electronics.

16. A system according to claim 1, in which the fault-monitoring device has an influence on control behavior of the control units that is limited to a predetermined percentage of a maximum possible control.

17. A system according to claim 16, in which limiting the control is effected by restricting a transfer of digital data from the fault-monitoring device to the control units to least significant bits.

18. A system according to claim 1, in which the steering handwheel is connected by way of a steering handwheel shaft to a torque-loading unit which generates a counter-torque on the steering handwheel dependent on requirements that are adjustable in dependence on the operational state of the vehicle.

* * * * *